United States Patent [19]

Stewart

[11] 4,359,968

[45] Nov. 23, 1982

[54] FLUIDIZED BED HEAT EXCHANGER UTILIZING A BAFFLE SYSTEM

[75] Inventor: Robert D. Stewart, Verona, N.J.

[73] Assignee: Foster Wheeler Energy Corporation, Livingston, N.J.

[21] Appl. No.: 2,160

[22] Filed: Jan. 10, 1979

[51] Int. Cl.³ .............................................. F28D 13/00
[52] U.S. Cl. .................................... 122/4 D; 110/263
[58] Field of Search ............... 122/4 D; 110/245, 263; 34/57 A; 432/58; 431/7, 170

[56] References Cited

U.S. PATENT DOCUMENTS

| | | | |
|---|---|---|---|
| 2,932,498 | 4/1960 | Metcalf et al. | 432/58 |
| 3,696,793 | 10/1972 | Bell | 122/4 D |
| 3,716,003 | 2/1973 | Battcock | 122/4 D X |
| 3,851,405 | 12/1974 | Furukawa | 34/57 A |
| 3,851,406 | 12/1974 | Dumitru | 34/57 R |
| 3,863,577 | 2/1975 | Steever et al. | 110/245 |
| 3,882,798 | 5/1975 | Reese | 110/245 |
| 3,890,935 | 6/1975 | Moss et al. | 122/4 D |
| 3,907,674 | 9/1975 | Roberts et al. | 210/20 |
| 3,910,235 | 10/1975 | Highley | 122/4 D |
| 4,017,253 | 4/1977 | Wielang et al. | 432/58 |
| 4,036,153 | 7/1977 | Nauta | 110/245 |
| 4,039,290 | 8/1977 | Inada | 34/57 A X |

FOREIGN PATENT DOCUMENTS 927660 5/1963 United Kingdom ............... 122/4 D

Primary Examiner—Edward G. Favors
Attorney, Agent, or Firm—Marvin A. Naigur; John J. Herguth, Jr.; John E. Wilson

[57] ABSTRACT

A fluidized bed heat exchanger in which a bed of particulate material is supported on a grate in a housing and air is passed through the grate and the particulate material to fluidize the bed and promote the combustion of combustible material contained therein. A baffle system is disposed in the housing for impacting with the entrained particulate material in the air and gaseous products of combustion to remove the latter material and permit it to fall by gravity back to the bed. A series of tube sections are provided in the housing for directing the air and gaseous products to the baffle means and gases are injected from the proximity of the baffle means downwardly towards the bed.

14 Claims, 4 Drawing Figures

FLUIDIZED BED HEAT EXCHANGER UTILIZING A BAFFLE SYSTEM

BACKGROUND OF THE INVENTION

The present invention relates to fluidized beds and, more particularly, to a fluidized bed heat exchanger in which a baffle system is provided for separating the entrained particulate bed material from the discharging air and gaseous products of combustion.

The use of fluidized beds has been recognized as an attractive means of generating heat. In these arrangements, air is passed through a bed of particulate material, which normally consists of a mixture of inert material and a fossil fuel such as coal, to fluidize the bed and to promote the combustion of the fuel. When the fluidized bed system is utilized as a steam generator, a boiler, a gasifier, or the like, it offers an attractive combination of high heat release, improved heat transfer to surfaces within the bed, and compact size.

In all fluidized bed reaction processes unreacted or partly reacted particles are entrained by the air and gaseous products of combustion passing upwardly from the bed and escape into an area immediately above the bed commonly referred to as a "freeboard space." In a majority of these type of designs, the height of the freeboard space must be limited to less than an optimum value to reduce heat losses and maintain high inlet temperatures.

However, this limitation of the freeboard space height is not without disadvantages. For example, it curtails the residence time of the gases in the freeboard space resulting in less than optimum reaction efficiency. Also, it is inconsistent with the design goal of maintaining the freeboard space at temperatures at, above, or near operating bed temperatures to kinetically promote more complete reactions above the bed. Further, it promotes a maldistribution of the gaseous products of combustion which renders the latter excessively rich in carbon monoxide and hydrocarbons resulting in incomplete combustion.

SUMMARY OF THE INVENTION

It is therefore an object of the present invention to provide a fluidized bed heat exchanger in which a relatively low freeboard space height can be utilized while eliminating the above-identified disadvantages thereof.

It is a further object of the present invention to provide a fluidized bed heat exchanger of the above type in which the residence time of the bed particles in the freeboard space are increased relative to similar beds of the same dimensions.

It is a still further object of the present invention to provide a fluidized bed heat exchanger of the above type in which the turbulence of the air and gaseous products of combustion is promoted to improve the reaction efficiency and promote better gas-solids contacting.

It is a still further object of the present invention to provide a baffle system in the freeboard space above the fluidized bed for impacting with the entrained particulate material in the air and gaseous products of combustion to remove the entrained material and permit it to fall by gravity back to the bed.

It is a still further object of the present invention to provide a fluidized bed heat exchanger of the above type in which a heat absorbing media is injected from the proximity of the aforementioned baffle system, downwardly towards the bed to promote a more complete reaction and temperature control over the bed surface.

It is a still further object of the present invention to provide a fluidized bed heat exchanger of the above type in which additional air is injected from the proximity of the aforementioned baffle system, downwardly towards the bed in a sufficient quantity to complete the combustion process.

It is a still further object of the present invention to provide a fluidized bed heat exchanger of the above type in which means are provided in the freeboard zone for directing the air and gaseous products of combustion to the aforementioned baffle system.

Toward the fulfillment of these and other objects the heat exchanger of the present invention comprises a grate supported in a housing and adapted to receive a bed of particulate material at least a portion of which is combustible. Air is passed through the grate and the bed of particulate material to fluidize the particulate material and promote the combustion of the combustible material. A baffle system is located above the bed of particulate material for impacting with the entrained particulate material in the air and gaseous products of combustion to remove the latter material from the air and gaseous products of combustion and permit the material to fall by gravity back to the bed. A series of tube sections are provided in the housing for directing the air and gaseous products of combustion to the baffle system and a heat absorbing media is injected from the proximity of the baffle means downwardly towards the bed.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings, wherein.

DESCRIPTION OF THE PREFERRED EMBODIMENTS

Figure 1:
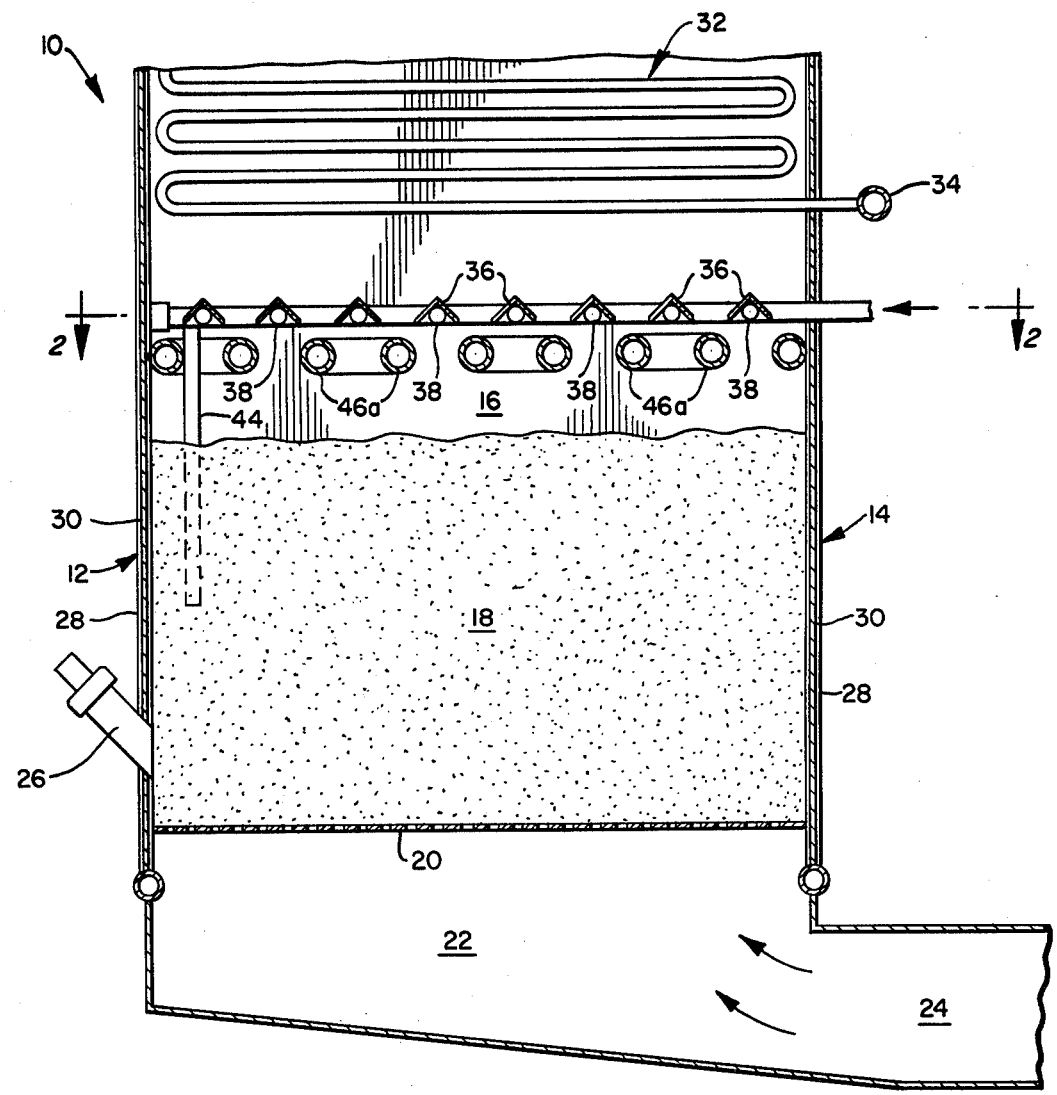
FIG. 1 is a vertical sectional view of a portion of the fluidized bed heat exchanger of the present invention.

Referring specifically to FIG. 1 of the drawings which depicts a fluidized bed steam generator incorporating features of the present invention, the reference numeral 10 refers, in general, to an enclosure consisting of a front wall 12, a rear wall 14, and two sidewalls one of which is shown by the reference numeral 16. The upper portion of the enclosure 10 is not shown for the convenience of presentation it being understood that it consists of a convection section, a roof, and an outlet for allowing the mixture of air and combustion gases to discharge from the enclosure 10 in a conventional manner.

A bed of particulate material, shown in general by the reference numeral 18, is disposed within the boiler 10 and rests on a perforated grate 20 extending horizontally in the lower portion of the enclosure 10. The bed 18 can consist of a mixture of discrete particles of inert material and fuel material such as bituminous coal, or the like. An air plenum chamber 22 is provided immediately below the grate 20 and an air inlet 24 is provided through the rear wall 14 of the boiler in communication with the chamber 22 for distributing air from an external source (not shown) to the chamber. It is understood that the above-mentioned distribution of air to the chamber 22 can be under the control of a damper, or the like, (not shown) in accordance with conventional practice.

A bed light-off burner 26 is mounted through the front wall 12 immediately above the grate 20 for initially lighting off the bed 18 during startup.

It is understood that a plurality of feeders can be associated with one or more of the walls 12, 14, or 16 for introducing particulate fuel material such as coal into the enclosure 10 at an area above the bed 18 to continuously supply the latter with fuel material. Also, a discharge device may be provided for removing the spent particulate material from the bed. These components have not been depicted in the drawings nor will be described in any further detail since they form no part of the present invention.

Figure 2:
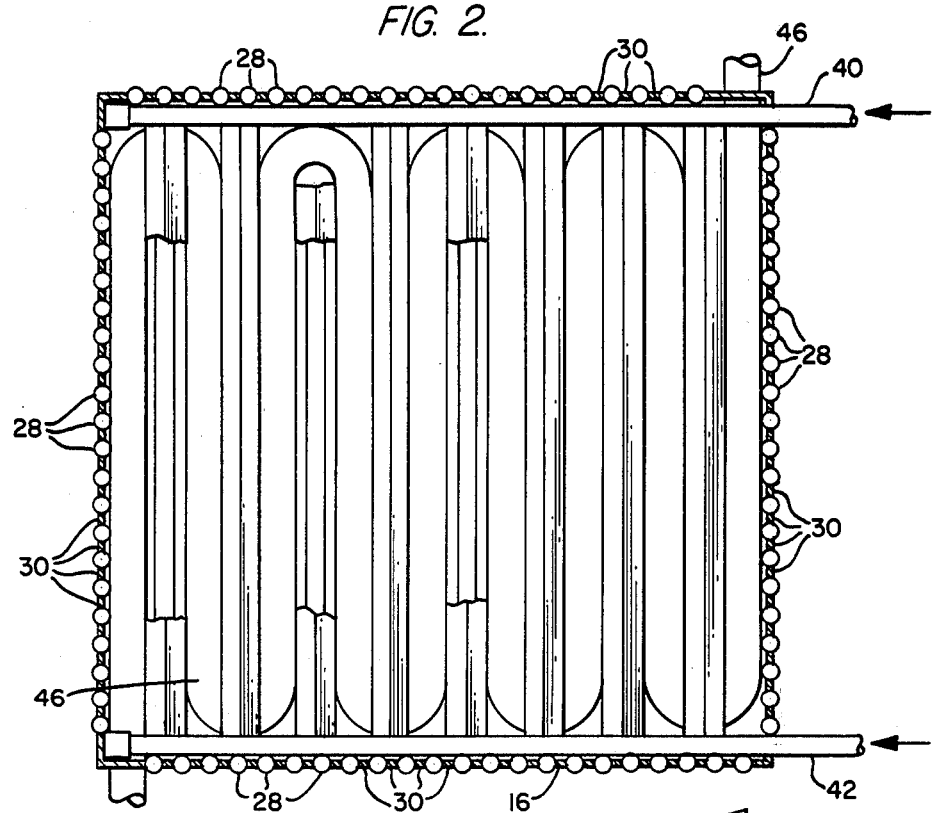
FIG. 2 is a cross-sectional view taken along the line 2—2 of FIG. 1.

As better shown in FIGS. 1 and 2, each of the walls 12, 14, and 16 is formed by a plurality of vertically extending spaced tubes 28 having continuous fins 30 extending from diametrically opposed portions thereof for the entire length of the tubes. The fins 30 of adjacent tubes 28 are connected together to render the resulting wall structure gas-tight. Although not shown in the drawings, it is understood that appropriate headers, downcomers, and the like, can be provided to permit water from an external source to be introduced into the lower portions of the walls 12, 14, and 16 whereupon it will pass upwardly through the walls to convert the water to steam by the heat provided by the fluidized bed.

Also for the purpose of adding additional heat from the fluidized bed to water, a bank of tubes, 32, is provided in the enclosure 10 above the bed 18, with one of the tubes being shown in FIG. 1. Each tube extends in a serpentine relationship from an inlet header 34 disposed externally of the housing and adjacent the rear wall 14 to an outlet header (not shown) also disposed externally of the housing 10. The remaining tubes 32 in the tube bank extend in a plane perpendicular to the drawing and parallel to the tube 32 shown. These tubes 32 can be provided for adding an incremental amount of heat to the water passing through the tubes such as for the purpose of superheat, reheat, etc.

A plurality of spaced, parallel baffle members in the form of angle irons 36 extend horizontally in the enclosure 10 and immediately above the bed 18. The angle irons 36 extend between the sidewalls 16 and therefore across the width of the housing, it being understood that they can be supported at their end portions relative to the sidewalls 16 by lugs, support beams, or enclosure wall attachment in a conventional manner. The angle irons 36 are disposed with their apex extending upwardly, and a distributor pipe 38 is nested within each angle iron 36 and extends for the length of the latter. As shown in FIG. 2, the pipes 38 extend in a spaced parallel relationship between two headers 40 and 42 (FIG. 2) which distribute a heat absorbing media from an external source to the pipes 38. The pipes 38 have a plurality of perforations or discharge openings formed in their lower portions as viewed in FIG. 1 to discharge the heat absorbing media outwardly and downwardly towards the bed 18. The heat absorbing media injected through the distributors 38 may be air, a liquid, a flue gas, or recirculated dust or materials, as well as an acceptor, such as fresh limestone. In this manner, the sensible heat in the freeboard space can be absorbed while the acceptors can remove $CO_2$ from the carbonants present in the mixture of the air and gaseous products of combustion, while not overloading the capacity of the outlet associated with the enclosure 10. Also, if air is utilized as the heat absorbing media it can be injected in a sufficient quantity to insure complete combustion of the particulate fuel material in the bed.

A plurality of vertical pipes, one of which is shown by the reference numeral 44 in FIG. 1, are also connected to the headers 40 and 42 and may be perforated along their lengths to provide for additional discharge of a heat absorbing media into the enclosure 10.

An element in the form of a tube 46 is disposed immediately below the angle irons 36 and above the upper surface of the bed 18. The tube 46 is formed in a serpentine manner resulting in a plurality of spaced parallel tube sections 46a. As shown in FIG. 2, the ends of the tube 46 extend outwardly from their respective sidewalls 16 and can be connected to a source of cooling fluid which may be the same source that supplies the water to the tubes 28 of the walls 12, 14, and 16, and to the tubes 32. It is noted from FIGS. 1 and 3 that the tube sections 46a are disposed in a staggered, offset relation to the angle irons 36 and pipe 38 and, as such, will direct the air and gases from the bed 18 to the angle irons and pipes for reasons that will be explained in detail later.

In operation, air is introduced into the chamber 22 from the inlet 24 and passes upwardly through the grate 20 and into the bed to loosen the particulate material in bed 18 and fluidize same. The light-off burner 26 is fired until the bed reaches a predetermined elevated temperature to support combustion of the particulate fuel material, after which it is turned off and new particulate fuel material is added as needed to maintain predetermined bed temperatures.

Figure 3:
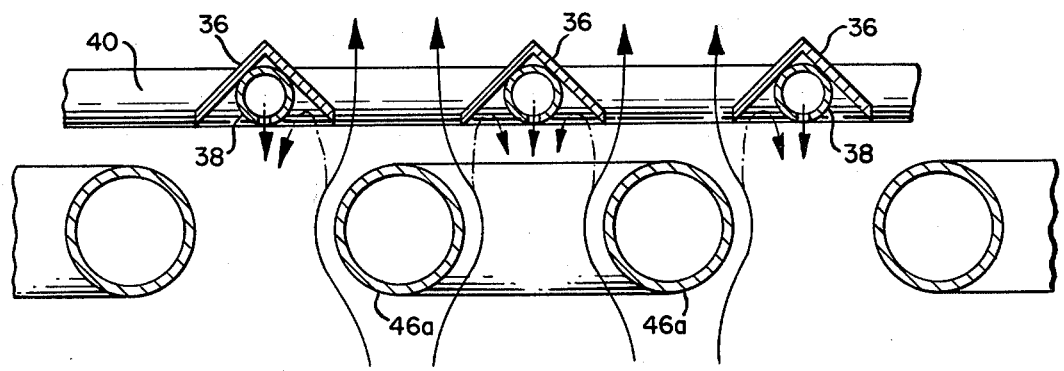
FIG. 3 is an enlarged sectional view of a portion of the components of FIG. 1.

As shown in FIG. 3, the mixture of air and gaseous products of combustion passing upwardly from the bed 18 passes in a tortuous path due to the offset arrangement of the tube sections 46a relative to the angle irons 36. The tube sections 46a aid in directing the aforementioned mixture towards the angle irons 36 and the pipes 38 where it impacts against the latter to induce separation of any particle material entrained in the mixture, which particle material falls back into the bed 18 by gravity. This, of course, aids in increasing the reaction time of the entrained particles and, in addition, promotes turbulence in the freeboard to promote more complete reaction and uniformity of product by forcing the nonuniform mixture of gases and air to mix.

The distributor pipes 38 distribute the heat absorbing media from the manifolds 40 and 42 towards the bed 18 also to promote more complete reaction and, in addition, to control the bed temperature, i.e. to reduce or limit peak temperatures and reduce the ferocity of the fire ball zone. Also, the media from the pipes 38 will work the entrained particulate material downwardly back toward the bed.

The pipes 44 are utilized to inject additional heat absorbing material into the freeboard zone or directly into the bed to provide cooling and to blow out the fine dust which may be entrained in the mixture of air and gases passing upwardly in the freeboard space.

It is noted that the angle irons 36, the distributor pipes 38 and the tube sections 46a act as a radiant screen above the bed to keep the required reaction heat in the freeboard zone high enough to enable more complete reactions to occur in the freeboard zone.

Cooling fluid which may be from the same source as the fluid that is passed through the walls 12, 14, and 16 is introduced into the pipe 46 and flows through the pipe sections 46a to maintain the latter cool and to aid in the control of the freeboard temperature.

As a result of the foregoing, the freeboard height can be limited to reduce heat losses and maintain high inlet temperatures to gas turbine generators, yet the aforementioned disadvantages of same are eliminated.

Figure 4:
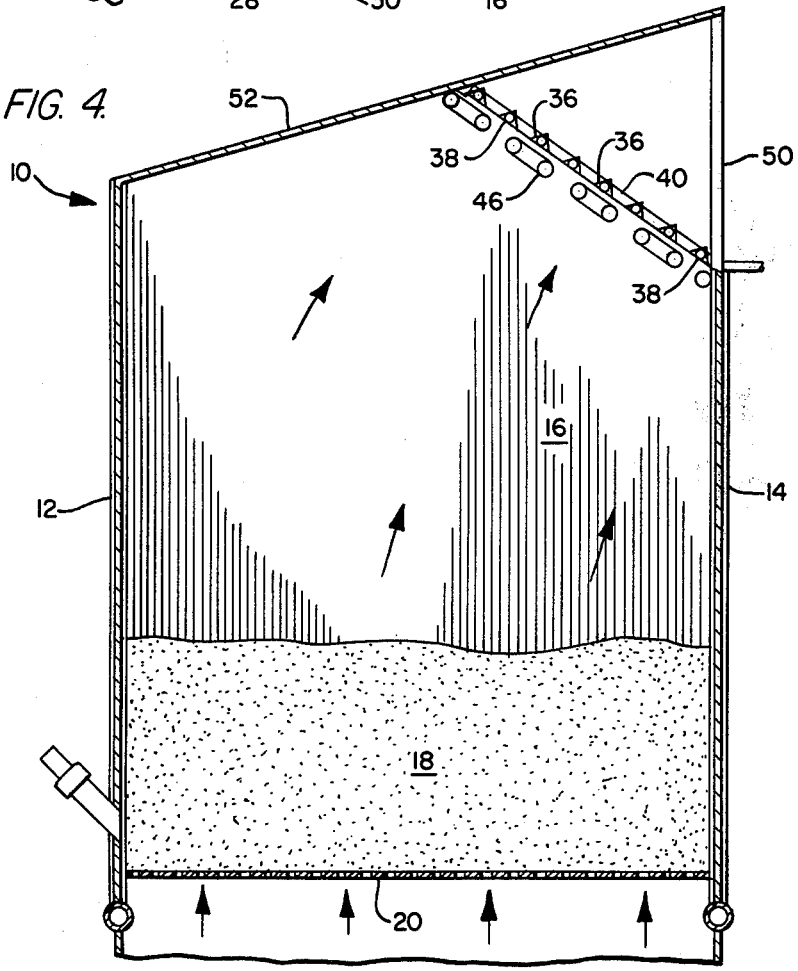
FIG. 4 is a view similar to FIG. 1 but depicting an alternate embodiment of the present invention.

An alternate embodiment of the fluidized bed heat exchanger of the present invention is shown in FIG. 4 and identical components are given the same reference numerals. In the embodiment of FIG. 4, the rear wall 14 is higher than the front wall 12 and a gas exit opening 50 is formed in the upper section of the rear wall. A roof 52 is formed for the enclosure 10 and extends at an angle upwardly from the front wall 12 to the rear wall 14 as shown. With this arrangement, the mixture of air and the gaseous products of combustion pass upwardly and generally to the right as shown by the arrows in FIG. 4. The angle irons 36, the gas distributors 38 (and therefore the headers 40 and 42) along with the tube 46 are disposed in the upper right hand corner of the housing immediately adjacent the exit 50 and extend in a plane disposed at an angle to the horizontal. As a result, the air and gases passing upwardly from the bed 18 will pass over these components in a manner identical to that shown in connection with the previous embodiment. Therefore, the advantages and features disclosed in connection with the embodiment of FIGS. 1-3 are identical with respect to the embodiment of FIG. 4.

It is understood that although both embodiments of the present invention have been described in terms of a steam generator for the purposes of example, other types of fluidized bed heat exchangers such as a boiler, a combustor, a gasifier, or the like, can be utilized within the scope of the invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A fluidized bed heat exchanger comprising a housing, grate means supported in said housing and adapted to receive a bed of particulate material at least a portion of which is combustible, means for passing air through said grate means and said bed of particulate material to fluidize said bed of particulate material and promote the combustion of said combustible material, means in the upper portion of said housing for permitting said air and the gaseous products of combustion to exit from said housing, baffle means, including a plurality of spaced baffle members, in said housing disposed between said bed of particulate material and said exit means for impacting with the entrained particulate material in said air and gaseous products of combustion to remove said latter material from said air and gaseous products of combustion and permit said latter material to fall by gravity back to said bed, means in said housing for directing said air and gaseous products of combustion to said baffle means, said directing means including at least one element having sections which are in a staggered, offset relation to the baffle members, and means for injecting a heat absorbing media from the proximity of said baffle means downwardly towards said bed.

2. The heat exchanger of claim 1, wherein said housing is formed by a plurality of tubes through which water is passed to convert the water to steam, and wherein said directing means comprises at least one tube extending between said bed and said baffle means and adapted to pass said water therethrough.

3. The heat exchanger of claim 2, wherein said latter tube is bent into a serpentine form to form a plurality of spaced parallel sections extending in an offset staggered relationship relative to said spaced baffle members.

4. The heat exchanger of claim 1, wherein said spaced baffle members comprise a plurality of spaced parallel angle irons extending across said housing.

5. The heat exchanger of claim 4, wherein said injection means comprises a plurality of pipes extending under said angle irons and having a plurality of openings therein for injecting said heat absorbing media.

6. The heat exchanger of claim 5, wherein said heat absorbing media is air and is injected in sufficient quantity to insure complete combustion of said particulate fuel material.

7. The heat exchanger of claims 4 or 5, wherein said directing means comprises a tube bent into a serpentine form to form a plurality of spaced parallel sections extending in an offset staggered relationship relative to said spaced baffle members.

8. The heat exchanger of claim 1, wherein said baffle means and said directing means together define a tortuous path for said air and gaseous products of combustion as they pass from said bed to said exit.

9. A fluidized bed heat exchanger comprising a housing formed by a plurality of tubes through which water is passed to convert the water to steam, grate means supported in said housing and adapted to receive a bed of particulate material at least a portion of which is combustible, means for passing air through said grate means and said bed of particulate material to fluidize said bed of particulate material and promote the combustion of said combustible material, means in the upper portion of said housing for permitting said air and the gaseous products of combustion to exit from said housing, baffle means in said housing disposed between said bed of particulate material and said exit means for impacting with the entrained particulate material in said air and gaseous products of combustion to remove said latter material from said air and gaseous products of combustion and permit said latter material to fall by gravity back to said bed, means comprising at least one tube disposed between said bed and said baffle means for directing said air and said gaseous products of combustion to said baffle means, said tube adapted to pass a cooling fluid therethrough, and means for injecting a heat absorbing material from the proximity of said baffle means downwardly towards said bed.

10. The heat exchanger of claim 9, wherein said latter tube is bent into a serpentine form to form a plurality of spaced parallel sections extending in an offset staggered relationship relative to said angle irons.

11. A fluidized bed heat exchanger comprising a housing, grate means supported in said housing and adapted to receive a bed of particulate material at least a portion of which is combustible, means for passing air through said grate means and said bed of particulate material to fluidize said bed of particulate material and promote the combustion of said combustible material, means in the upper portion of said housing for permitting said air and the gaseous products of combustion to exit from said housing, baffle means comprising a plurality of spaced parallel angle irons extending across said housing and disposed between said bed of particulate material and said exit means for impacting with the entrained particulate material in said air and gaseous products of combustion to remove said latter material from said air and gaseous products of combustion and permit said latter material to fall by gravity back to said bed, means in said housing for directing said air and gaseous products of combustion to said baffle means, and means for injecting a heat absorbing media from the proximity of said baffle means downwardly towards said bed.

12. The heat exchanger of claim 11, wherein said injection means comprises a plurality of pipes extending under said angle irons and having a plurality of openings therein for injecting said heat absorbing media.

13. The heat exchanger of claim 12, wherein said heat absorbing media is air and is injected in sufficient quantity to insure complete combustion of said particulate fuel material.

14. The heat exchanger of claims 11 or 12, wherein said directing means comprises a tube bent into a serpentine form to form a plurality of spaced parallel sections extending in an offset staggered relationship relative to said angle irons.

* * * * *